Sept. 26, 1944.  G. A. TINNERMAN  2,358,837
SPRING NUT FASTENER OR THE LIKE
Original Filed Sept. 3, 1941
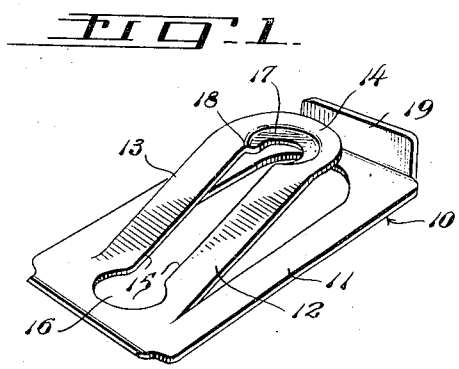
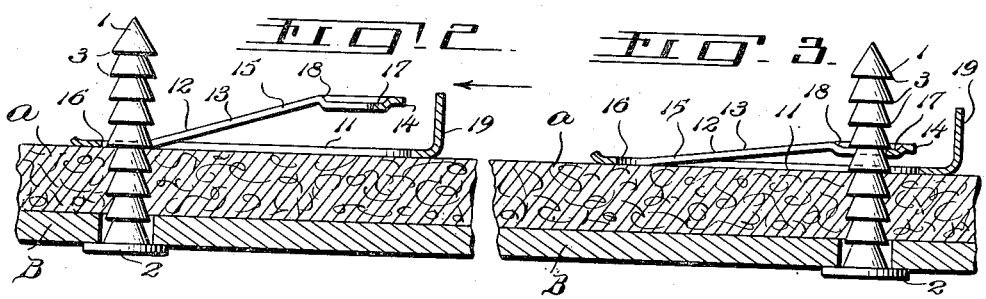
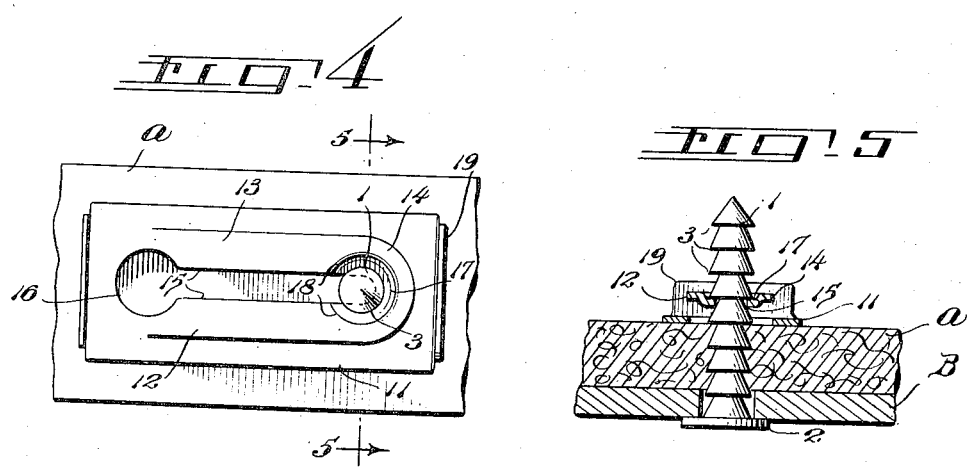
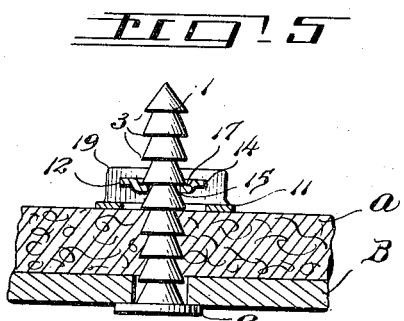
Inventor:
GEORGE A. TINNERMAN
By Bates, Teare & McBean
Attorneys Patented Sept. 26, 1944

2,358,837

UNITED STATES PATENT OFFICE 2,358,837

SPRING NUT FASTENER OR THE LIKE

George A. Tinnerman, Cleveland, Ohio, assignor to Tinnerman Products, Inc., Cleveland, Ohio, a corporation of Ohio Original application September 3, 1941, Serial No. 409,423. Divided and this application April 30, 1943, Serial No. 485,184

11 Claims. (Cl. 85—36)

This application is a division of my pending application, Serial No. 409,423, filed September 3, 1941, for Spring nut fasteners or the like. The invention is directed to fasteners of the type embodying a sheet metal spring locking plate or the like designed for use with a cooperating bolt or stud fastening member in the manner of a nut device for securing the parts of an assembly.

More particularly, the invention deals with an improved form of sheet metal spring nut device adapted to fasten with a transversely grooved, barbed or otherwise shouldered bolt or stud by being applied generally transversely of the stud to a position in which the parts secured thereby are clamped firmly and rigidly under continuously effective spring force.

In many installations which are subject to continuous vibratory motion and heavy usage, heretofore known fasteners of this character have been found to lack the combination of required resiliency and durability to absorb the effects of shock and vibration as necessary to withstand loosening or removal from applied fastening position over any extended period of use. It is a primary object of the present invention to provide such a fastener comprising a simple, inexpensive sheet metal device which is applied generally transversely to fastening engagement with a cooperating bolt or stud and which embodies an improved construction making for increased resiliency coupled with durability whereby the fastener is capable of withstanding severe conditions of shock, vibration and the like in providing a strong and reliable fastening assembly over a long period of service.

Another object is to provide a fastener of this character having an improved simplified construction which lends itself to the very economical quantity production of the fasteners.

Still another object is to provide such a fastener which is simple, durable and, in addition, has the desired increased resiliency for securing the parts of an assembly under a high degree of continuously effective spring force in a manner to absorb the effects of any shock, vibratory motion or the like which could possibly cause a loosening or removal of the fastening device from applied fastening position.

A further, more specific, object of the invention is to provide a fastener of the kind described which is relatively cheaper in cost in that less material is required in forming the same from a comparatively small sheet metal body providing a base and a complementary spring arm member provided from the material of said base to extend out of the plane thereof in yieldable relation thereto in a manner to provide for increased resiliency in such a fastener and otherwise supply a high degree of spring tension on the cooperating bolt or screw in applied fastening position in a completed assembly.

A still further object is to provide such a sheet metal fastener in which the complementary spring arm member is struck from the base of the fastener to extend in yieldable relation thereto in a manner to exert a progressively increasing axial spring force on the bolt or stud on being applied to fastening engagement therewith, and which spring arm member is provided with means for preventing movement of the fastener in a direction toward loosening or removal from finally applied fastening engagement with the bolt or stud.

Still another object of the invention is for the provision of a fastener of this character having an upturned end portion to which a tool may be applied for easily and quickly applying the fastener and also for releasing the same.

Further objects and advantages, and other new and useful features in the construction, arrangement and general combination of parts of the invention will be readily apparent to those skilled in the art as the description thereof proceeds with reference to the accompanying drawing, for purposes of illustration but not of limitation, in which like reference characters designate like parts throughout the same, and in which:

Fig. 1 is a perspective view of a preferred form of the improved fastener; Fig. 2 is a sectional view showing the fastener as initially applied to a stud in position for securing the parts of an assembly; Fig. 3 is a similar view showing the fastener in finally applied fastening position; Fig. 4 is a plan view of Fig. 3; and, Fig. 5 is a sectional view of Fig. 4 taken on the line 5—5, looking in the direction of the arrows.

Referring now, more particularly, to the drawing, Fig. 1 shows on an enlarged scale the general construction of the improved fastener which may be produced at very low cost from a relatively small, inexpensive blank of any suitable sheet metal, preferably spring metal or cold rolled metal having spring-like characteristics. The fastener may, of course, be formed from blanks of various outlines, but from the standpoint of most economical quantity production, is best provided from a relatively small, generally rectangular blank which may be obtained at low cost from ordinary sheet metal strip stock with a minimum loss or waste of material. The fasteners otherwise are characterized by a simplified construction embodying a high degree of resiliency and which construction is admirably suited for quantity production at very low cost in that only a single thickness of metal stock is required and merely the simplest stamping and forming operations are involved such that the devices may be manufactured on standard punch presses at tremendously high rates of production.

Generally speaking, the fasteners are so constructed as to have what may be termed a sliding, wedge-type of fastening action with a cooperating bolt or stud in securing any two or more parts A, B, in an assembly under a continuously effective spring clamping force. The bolt or stud 1 may be of any suitable character comprising a barbed, grooved or otherwise shouldered shank which may be driven into and through the parts to be secured or otherwise passed through aligned openings therein with a leading end portion of said shank projecting from the rearward side of the assembled parts.

In the present example, the stud is shown in a preferred form comprising an enlarged head 2 and a ring-barbed shank defining a plurality of spaced shoulders 3 which afford certain advantages when one or more of the parts secured is of relatively soft, porous composition such as fibrous insulating material used in refrigerators, automobile bodies, etc., or sheathing board or the like to which are secured shingles or siding slabs in various building constructions. In this respect, bolts or studs having such a ring-barbed shank serve the dual purpose, first, of providing sufficient holding ability in the fibrous insulating material, sheathing board, or the like, A, for temporarily installing shingles or other parts B in proper assembled relation thereon prior to finally securing said parts, whereas an ordinary nail having only a smooth or roughened shank would not be held with sufficient gripping force for this purpose by the relatively soft and porous composition of such materials; and second, such a barbed shank defines a pronounced shoulder or rib construction with which the cooperating spring nut fasteners 10 applied thereto from the rearward side of the installation are capable of positive locking action in fastening the parts A, B, in permanently secured position, as presently to be described.

The ring-barbed stud otherwise is such as to define a series of sharp abutments or shoulders 3 spaced by grooves receiving the adjacent surrounding material of part A on being driven therein to interlock with the shank and engage particularly said shoulders 3 thereof and thereby resist withdrawal of the stud after being applied to install the parts to be secured in temporary fastening position. Even though the relatively soft and porous composition of part A lacks sufficient body to retain ordinary nails, the use of the ring-barbed studs provides for sufficient holding power to retain the part B thereon effectively in temporarily installed relation; and thus, in a building construction, for example, a speedy and economical method of procedure involves the temporary installation of shingles on the exterior side of an area of sheathing to completion, if desired, before the application of the cooperating spring fasteners 10 to the studs from the interior side of the sheathing for permanently securing the shingles thereto.

In providing the general type of fastener shown in Fig. 1, the selected form of blank or sheet metal body 10, is designed to define a suitable base 11 from which is stamped or struck and formed a cooperating stud retaining element 12 in the form of substantial spring arm or the like which is integral at one end with said base 1 and extends in inclined spaced relation thereto in a manner to provide for a high degree of resiliency relative to and in cooperation with said base 11. Said spring arm element 12 otherwise is so formed to include an intermediate portion 13 which is inclined gradually from said base and terminates in a free end portion 14 extending in predetermined generally parallel and spaced relation to said base 11.

The spring arm is provided with a longitudinal slot 15 of substantially uniform width extending from adjacent the area in which said spring arm is integral with the base 11 of the fastener to the substantial center area of the free end portion 14. The width of said slot is only slightly greater than the root diameter of the shank at the bottoms of the grooves adjacent the shoulders 3 such that when the spring arm of the fastener is connected to the stud in engagement with any of said shoulders, as shown in Fig. 5, there is provided a positive locked relation from which the spring fastener cannot be removed by movement axially of the stud. Said slot 15 terminates in an enlarged circular stud receiving opening 16 lying substantially entirely in the base 11 of the fastener adjacent the area in which the spring arm 12 is integral therewith. Said opening 16 is of a size for receiving readily the overall diameter of the stud shank as defined by the shoulders 3 and preferably with only slight clearance in order that the stud may be received readily in said opening and the adjoining edges of the slot 15 easily and quickly guided into engagement with the adjacent shoulder 3 of the engaged ring-barb of the stud.

At the end of the slot 15 in the free end portion 14 of the spring arm, the surrounding marginal edge preferably is provided with a depression forming a rigid, generally annular seat 17 for the shoulder of the engaged ring-barb and which seat is bordered by a retaining rim defining locking elements or projections 18 adjacent the slot 15 which prevent any movement of the fastener in a direction toward removal from applied fastening engagement with the stud. The spring arm 12 otherwise is provided in a more or less predetermined spaced relation to the base 11 according to service requirements and the amount of resiliency necessary for clamping the parts of the assembly most effectively under continuous spring force. Preferably one end of the base 11 is bent upwardly to provide a flange 19 which may be grasped by the fingers or engaged by a suitable tool for easily and quickly applying the fastener, or for removing the same in a minimum of time and effort.

From the foregoing, it will be understood that the fastener constructed substantially as described and shown in Fig. 1 is applied as illustrated in Fig. 2, by first positioning the stud receiving opening 16 therein over the projecting pointed end of the stud extending through the parts A, B, to be secured. The flat base 11 of the fastener is pressed flush against the adjacent rearward face of part A to take up any clearance in the assembly and otherwise dispose the adjacent edges of the slot 15 on either side of the stud shank under the shoulder defined by the ring-barb 3 to be engaged by said edges bordering the slot. The fastener is then pushed or slid longitudinally in the direction indicated by the arrow in Fig. 2, to the position shown in Fig. 3, and during this action the engaged shoulder 3 of the stud rides on the longitudinal edges bordering the slot 15 over the intermediate inclined portion 13 of the spring arm. This causes the spring arm to be compressed toward the base 11 of the fastener as necessary for the engaged shoulder 3 to snap over the retaining rim portions 18 onto the free end portion 14 of the spring arm to be finally positioned on the seat 17 defined by the depression around the adjacent end of the slot 15. It will be understood that in such application of the fastening device whereby the engaged shoulder 3 rides on the inclined intermediate portion 13 of the spring arm, said spring arm exerts a progressively increasing camming or wedging action on said shoulder to draw the stud axially and tighten the assembly of secured parts A, B. In the final fastening position of the fasteners shown in Figs. 3, 4, and 5, the spring arm 12 is maintained in a constantly tensioned condition from the initial, normal position thereof shown in Fig. 2, and thereby exerts a continuous axial pull on the stud as the base 11 of the fastener resiliently engages the adjacent part A and clamps the same to part B under continuously effective spring force in the completed fastening installation. In this relation, the engaged shoulder 3 of the stud is firmly and rigidly positioned on the seat 17 beyond the adjacent rim portions 18 which define locking projections adapted to engage the stud and prevent any reverse movement of the fastener in a direction toward removal from applied fastening position.

Removal of the fastener may be effected readily by a suitable force on the fastener, as through flange 19, to cause the spring arm 12 to be depressed sufficiently for the engaged shoulder 3 to ride over the locking projections 18 and otherwise slide on the inclined intermediate portion 13 to a position in which the stud is aligned with the stud receiving opening 16, whereupon the fastener may be removed easily and quickly in more or less the reversal of the foregoing described procedure for applying the fastener to fastening position.

The spring fastener in any form of the invention preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and preferably harder than that of the cooperating bolt or stud employed therewith in providing an effective and reliable fastening means adapted for a long period of satisfactory service and use.

I claim:

1. The combination, with a stud having a shoulder on its shank, of a fastener having a base with a resilient tongue cut from the base by a U-shaped slit and extending diagonally upward, there being an entirely enclosed slot extending from the base adjacent the root of the tongue and along the tongue to a region near the free end thereof, the end portion of the slot adjacent the root of the tongue being enlarged to allow the passage of the shoulder on the stud shank, the end portion of the slot at the free end of the tongue being narrower than the shoulder on the shank, whereby the stud may be inserted through the enlarged portion of the slot and thereafter by longitudinal movement of the fastener may have its shoulder engage the tongue and press the same toward the base.

2. The combination, with a stud having an external annular shoulder on its shank, of a fastener made of a single piece of resilient sheet material and having a base with a tongue cut from the base by a U-shaped slit, there being an entirely enclosed slot at least as wide as the smallest diameter of the shank extending from the base adjacent the root of the tongue and along the tongue to a region near the free end thereof, the end portion of the slot adjacent the root of the tongue being enlarged by a hole through the base to allow the passage of the shoulder on the stud shank, the intermediate region of the slot and the end portion thereof at the free end of the tongue being narrower than the shoulder on the shank.

3. A fastener made of a single piece of resilient material providing a base with a tongue cut therefrom and extending along the tongue and terminating at one end in an enlarged opening through the base adjacent the junction of the tongue sides with the base, said enlarged opening being bridged on the outer side by the end portion of the fastener base.

4. A fastener made of a single piece of resilient material comprising a substantially flat base portion having one end bent upwardly to provide a flange, there being a tongue cut out of the base by a U-shaped slit and a longitudinally enclosed slot, the two sides of the tongue joining the base adjacent the end opposite said flange and the flange being entirely beyond the free head of the tongue, said slot terminating at the base end of the tongue in an enlarged opening.

5. A fastener made of a single piece of resilient sheet material comprising a substantially flat base upturned for a short distance at the end thereof, and a tongue cut from the body of the base and anchored thereto adjacent the end thereof opposite the upturned end and extending at an acute angle to the base toward said upturned end but terminating short thereof and not covered by any portion of the fastener, said tongue having adjacent its free end an opening for the passage of a stud and having a slot extending lengthwise of the tongue and communicating with an enlarged opening through the base adjacent the junction of the tongue with the base.

6. A fastener comprising a single strip of resilient sheet material providing a base and an upturned flange at one end of the base, a tongue cut from the body of the base and having spaced sides the ends of which join the base adjacent the end thereof opposite the upturned end, said tongue extending at an acute angle to the base and having adjacent its free end an opening for the passage of a stud and having a margin about the opening depressed from the adjacent body of the tongue, said depressed end portion terminating short of the upturned flange so as to be entirely uncovered by any portion of the fastener.

7. A fastener made of a single piece of resilient spring metal comprising a substantially flat base portion flanged upwardly at one end and inclined upwardly slightly at the other end, there being a tongue cut out of the base by a U-shaped slit and an internal slot, the sides of the tongue joining the base adjacent the slightly inclined end thereof, said slot terminating at that end in an enlarged opening through the base closed across its end by the end portion of the base, said tongue having in its upper surface a depression about the other end of the slot leaving a partly annular region about such end adapted to form a seat for a shoulder on a stud which may pass through the enlarged opening.

8. A fastener made of a single integral piece of resilient sheet material and providing a base and a tongue cut from an intermediate region of the base and bent upwardly at an acute angle thereto, said tongue having a longitudinal slot through it completely closed at each end and having its two sides joined to the base, the slot between the legs being narrower at the free end portion of the tongue than adjacent the base, whereby a shouldered stud may be passed freely through the fastener and thereafter engage the top of the tongue, the free end portion of said tongue being uncovered by any portion of the base, whereby a stud passing through the base and the tongue may extend freely well beyond the tongue.

9. A fastener made of a single piece of resilient material cut and deformed to provide a substantially flat base with a tongue partially severed from the base and bent up at an acute angle thereto with the remainder of the base forming a four-sided frame about the tongue, said tongue having a longitudinal slot extending through it and terminating in a rounded end of materially greater size in the region where the tongue joins the base, whereby a shouldered stud may be passed freely through the fastener base adjacent the root of the tongue and thereafter bindingly overhang the tongue at the upper end of the slot therein.

10. A fastener made of a single piece of resilient material cut and deformed to provide a substantially flat base with a tongue partially severed from the base and bent up at an acute angle thereto with the remainder of the base forming a four-sided frame about the tongue, said tongue having a longitudinal slot extending through it and terminating in a rounded end at the free end portion of the tongue and in a rounded end of materially greater size in the region where the tongue joins the base, the forward end of said base being tipped up slightly and the rear end terminating in an upward flange whereby the fastener may readily be shoved forwardly to cause it to coact bindingly with a shouldered stud passed through the enlarged opening.

11. The combination with a multiple-shouldered stud and a fastener having a base and an inclined tongue with a longitudinal slot therein terminating in an enlargement at the root of the tongue, the normal height of the free end of the tongue above the base being greater than the distance from one shoulder to the next on the stud, whereby the stud may be passed freely through the enlarged opening in the fastener and thereafter by relative longitudinal movement between the fastener and stud may ride along the upper surface of the tongue and gradually depress the same toward the base so that in the final position the resilience of the tongue draws the stud snugly into position.

GEORGE A. TINNERMAN.